(12) United States Patent
Ye et al.

(10) Patent No.: US 8,949,588 B1
(45) Date of Patent: Feb. 3, 2015

(54) MOBILE TELEPHONE AS BOOTSTRAP DEVICE

(71) Applicants: Hua Ye, Nanjing (CN); Xiaodong Huang, Nanjing (CN); Yong Huang, Nanjing (CN); Yue Feng Li, Nanjing (CN); Wei Zuo, Nanjing (CN)

(72) Inventors: Hua Ye, Nanjing (CN); Xiaodong Huang, Nanjing (CN); Yong Huang, Nanjing (CN); Yue Feng Li, Nanjing (CN); Wei Zuo, Nanjing (CN)

(73) Assignee: Trend Micro Inc., Tokyo (JP)

( * ) Notice: Subject to any disclaimer, the term of this patent is extended or adjusted under 35 U.S.C. 154(b) by 83 days.

(21) Appl. No.: 13/863,235

(22) Filed: Apr. 15, 2013

(51) Int. Cl.
*G06F 21/00* (2013.01)
*G06F 21/56* (2013.01)

(52) U.S. Cl.
CPC .................................. *G06F 21/568* (2013.01)
USPC ........................................................... 713/2

(58) Field of Classification Search
CPC ...... G06F 21/568; G06F 21/51; G06F 21/575
USPC ........................................................... 713/2
See application file for complete search history.

(56) References Cited

U.S. PATENT DOCUMENTS

| | | | |
|---|---|---|---|
| 6,189,100 B1 * | 2/2001 | Barr et al. | 713/182 |
| 7,930,531 B2 * | 4/2011 | Chow et al. | 713/2 |
| 2005/0015606 A1 * | 1/2005 | Blamires et al. | 713/188 |
| 2005/0176415 A1 * | 8/2005 | Jang et al. | 455/418 |
| 2014/0173263 A1 * | 6/2014 | Pfeifer et al. | 713/2 |

OTHER PUBLICATIONS

Cutler, Cody, et al. "Trusted Disk Loading in the Emulab Network Testbed."CSET. 2010.*

* cited by examiner

*Primary Examiner* — Kambiz Zand
*Assistant Examiner* — Michael Guirguis
(74) *Attorney, Agent, or Firm* — Beyer Law Group LLP

(57) ABSTRACT

A mobile telephone is used to diagnose a computer with malware. The telephone becomes a bootable device with a bootable partition in persistent storage. An operating system image including antivirus software in the bootable partition of the telephone is used to bootstrap the affected computer. The antivirus software executes upon the computer and transfers results (files, checksums, registry data) to the mobile telephone. The telephone uploads these results to a remote cloud service which then develops instructions, patterns, files, etc. for counteracting the malware. The cloud service downloads this response to the mobile telephone which then transfers the response back to the computer. The antivirus software on the computer uses the response to remove the malware on the computer. An interface application on the mobile telephone handles transfer with the computer and uploading and downloading with the cloud service.

18 Claims, 6 Drawing Sheets

Boot-Failure Recovery System

FIG. 1

Boot-Failure Recovery System

MOBILE TELEPHONE AS BOOTSTRAP DEVICE

FIELD OF THE INVENTION

The present invention relates generally to bootstrapping a computer. More specifically, the present invention relates to bootstrapping and diagnosing a computer using a mobile telephone.

BACKGROUND OF THE INVENTION

Computers are now a part of everyday life and are relied upon by many people for performing work, communication and entertainment. Despite advances in computer hardware and software, computers still do crash, freeze, or are otherwise unable to start up due to a variety of reasons. Some of these problems are due to bugs in the operating system or in software applications, some are due to malware, and some may be even due to a user inadvertently deleting a file or changing a configuration setting.

In these situations the computer is unable to bootstrap properly and will not start up. In other words, even though the user may restart the computer or even turn it off and on again, the operating system will not bootstrap properly and the computer will not work. The only remedy is to reinstall the operating system from a known clean version of the operating system. Unfortunately, individuals lacking computer skills may inadvertently lose valuable data while performing this process, and in any case the process can be time-consuming. Further, for those with portable computers, not everyone carries the original operating system installation disks around with them.

One option is for the user to use a formatted bootstrap disk which includes the basic operating system files and utility software tools in order to bootstrap the computer manually. The user would bootstrap the computer from the operating system resident on the bootstrap disk. Once the computer starts up, the user may manually attempt to fix any problems found. The bootstrap disk may be a traditional disk such as a CD-ROM or may also be a USB drive. One disadvantage of this approach is that the user will not typically carry the necessary bootstrapping disks around with them (nor even the appropriate USB drive). Even if the user is at home, it is still necessary to find the appropriate disks, which sounds easy, but in practice, may also be time consuming. This option also requires some technical sophistication that is lacking in most users. Many people simply lack the technical ability to trace problems and manually reconfigure a computer in order to correct a problem. In addition, bootstrapping from the original operating system disk invariably means that the user must then perform the many software updates that have been released to update the operating system and software applications since the original operating system was first released.

Another option is to use a so-called rescue disk, which, as the term implies, is a special compact disk loaded with a version of the operating system that has been tailored for the purpose of rescuing a computer system that will not bootstrap. Such a disk is typically provided by antivirus vendors for a customer to scan, disinfect and restore an infected operating system. As such, the rescue disk is typically a bootstrap disk along with associated antivirus features. By inserting the rescue disk into the drive of the infected computer, the computer will be able to bootstrap from the rescue disk, and possibly allow the user to scan and clean malware from the computer.

As with the bootstrap disk, a user will not typically carry a rescue disk with him. In order for the rescue disk to query an antivirus service in the cloud, the rescue disk must make use of the computer's network connection. But, it can be problematic for the bootstrap image on the rescue disk to support all types of network cards that are found in many computers. Thus, the network connection may be nonexistent or limited when bootstrapping using a rescue disk.

U.S. patent application Ser. No. 10/683,874, discloses a technique for using a USB drive to bootstrap an affected computer. The USB drive includes an operating system for the affected computer, as well as communication software, monitoring software, and remote control software for use in diagnosing and fixing the computer. While this technique is an improvement over the prior art at the time, it relies upon the affected computer for executing the additional software and for communicating with a remote support center.

Given the above disadvantages with the prior art, and given the need for a user to be able to quickly and easily recover from a computer that will not bootstrap properly (whether that computer is a desktop computer, laptop computer or other), a system and technique is desired to remedy the disadvantages found in the prior art.

SUMMARY OF THE INVENTION

To achieve the foregoing, and in accordance with the purpose of the present invention, a boot-failure recovery system is disclosed that allows a mobile telephone to reboot and diagnose an affected computer.

Once the computer is bootstrapped from the mobile telephone diagnosis and repair can take place. Not only is the mobile telephone capable of uploading diagnostic data to a cloud-based antivirus service (such as results from scanning, behavioral analysis, etc.), but also the mobile telephone is able to download the latest patterns, cleaning files, etc. to the affected computer in order to solve the malware problem. Further, the mobile telephone provides the communication to the cloud. In the prior art, a static device such as a flash drive might not have the latest pattern or cleaning files, and, any communication with the antivirus service would rely upon the affected computer itself (such communication channel perhaps not operating due to the malware).

In one embodiment, a mobile telephone includes a persistent storage area in which a bootable partition is created. An operating system image created on the computer is written to the partition in the persistent storage so that the computer may be bootstrapped from this image. If necessary, a boot sector is also written to this partition to enable the bootstrapping. The operating system image includes an executable antivirus software product that when transferred to the computer and executed, is able to begin the diagnosis. Also included within the mobile telephone, in addition to its normal functionality, is an interface application that transfers information between the telephone and the computer such as results from an antivirus scan and any updated pattern, cleaning instructions, etc. The interface application also uploads the results from a scan on the computer to a remote cloud service so that the cloud service may develop appropriate instructions and data for removing the malware on the computer. Once developed, the interface application is also responsible for downloading instructions, cleaning patterns, files, etc. from the cloud service to the mobile telephone.

In a second embodiment a mobile telephone is used to diagnose a computer. An operating system image from persistent storage of the mobile telephone is used to bootstrap the affected computer; the image includes antivirus software. The antivirus software executes upon a computer and transfers results to the mobile telephone. The telephone uploads these results to a remote cloud service which then develops instructions, patterns, files, etc. for counteracting the malware on the computer. The cloud service downloads this information to the mobile telephone which then transfers the information back to the computer. The antivirus software on the computer is then able to use information from the cloud service in order to remove the malware on the computer.

In a third embodiment a system for diagnosing a computer infected with malware includes the infected computer itself which is unable to bootstrap. A mobile telephone connected to the computer with a cable has a persistent storage area that includes a bootable partition with an operating system image. The operating system image is arranged to execute upon the computer and also includes an executable antivirus software product. The mobile telephone also includes an interface application for transferring information between the telephone and computer, and for also uploading results from the antivirus product to a remote cloud service and for downloading remedies such as up-to-date virus pattern files, cleaning instructions, cleaning patterns, indications of which files are malicious, etc. The computer may be unable to access the Internet on its own because its network card cannot work without a proper device driver, and thus relies upon the mobile telephone to access the cloud service remotely.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention is able to use a mobile telephone as a so-called "rescue disk" in order to help a computer recover from a boot failure, thus addressing many of the problems listed above. As is commonly known, many people carry a mobile telephone with them when they are away from home, especially those who also use or carry a computer. These mobile telephones and very often a smartphone, capable of accessing the Internet, uploading or downloading information, executing applications, etc.

By creating a bootable partition on the mobile telephone, the telephone is not only a telephone, but also becomes a bootable device. The affected computer can be bootstrapped from the mobile telephone, and, a virus scanning tool may be executed upon the computer after transferring the tool to the computer from the telephone.

System Diagrams

Figure 1:
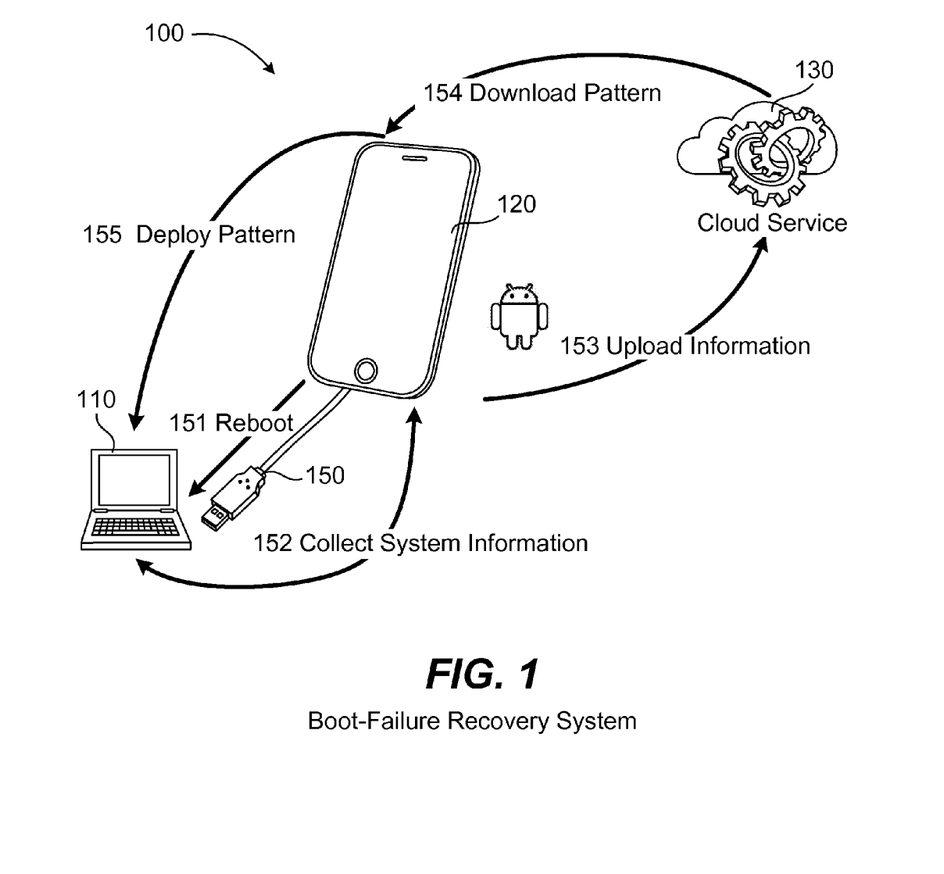
FIG. 1 illustrates one embodiment of a boot failure recovery system.

FIG. 1 illustrates one embodiment of a boot failure recovery system 100. Shown are an affected computer 110, a mobile telephone 120, and a cloud service 130. Computer 110 may be any suitable computer such as a desktop computer, laptop computer, portable computer, tablet computer, etc. Computer 110 has a problem in that it does not bootstrap properly, thus preventing its operating system from executing and running any software applications. The problem may lie in the bootstrap code itself, or in one of the operating system files. Accordingly, it is necessary to bootstrap the computer using an external bootable device. In the prior art, a compact disk or a USB drive might have been used, but these devices might not have had the latest version of the operating system and this technique relied upon the affected computer itself (if it could be made to operate properly) to access the Internet.

Mobile telephone number 120 is any suitable mobile telephone such as a smartphone executing a mobile operating system available from Apple Inc., Google, Inc., Microsoft, RIM, Samsung Inc., and includes those popular mobile telephones such as an iPhone telephone, an Android telephone, a Blackberry, etc.

Preferably, telephone 120 is able to access a telecommunications network for standard voice communications, and is also able to access the Internet using the same network over a protocol such as GPRS, 3G, 4G, etc. In addition to connecting to the Internet using its telecommunications network, telephone 120 may also access the Internet by connecting wirelessly to a local network such as a Wi-Fi network, a WiMAX network, etc.

Cloud service 130 is composed of any number of computer servers accessible over the Internet that provides antivirus services. In one example, cloud service 130 is provided by an antivirus service provider and is able to analyze information uploaded from an affected computer and to download antivirus products such as virus pattern files, cleaning patterns, rules, an indication of which files are malware, etc.

FIG. 1 also shows a number of high-level steps by which the mobile telephone may assist the affected computer recovering from a boot failure. In step 150 the telephone is connected to the computer such as by using a USB cable. In step 151 the telephone reboots the computer using an operating system present on the telephone. In step 152 the telephone collects computer system information using antivirus software executing upon the computer, and, in step 153 the telephone uploads this information to the cloud service 130. This information may include files, file names, "autorun" methods, etc. that have been collected by the antivirus software. After analysis by the cloud service, in step 154 the cloud service downloads a virus pattern file, a cleaning pattern, an indication of which file is malicious, or other antivirus product, to the mobile telephone, which in step 155 deploys the pattern file to the computer 110 in order to remove any malicious software.

Figure 2:
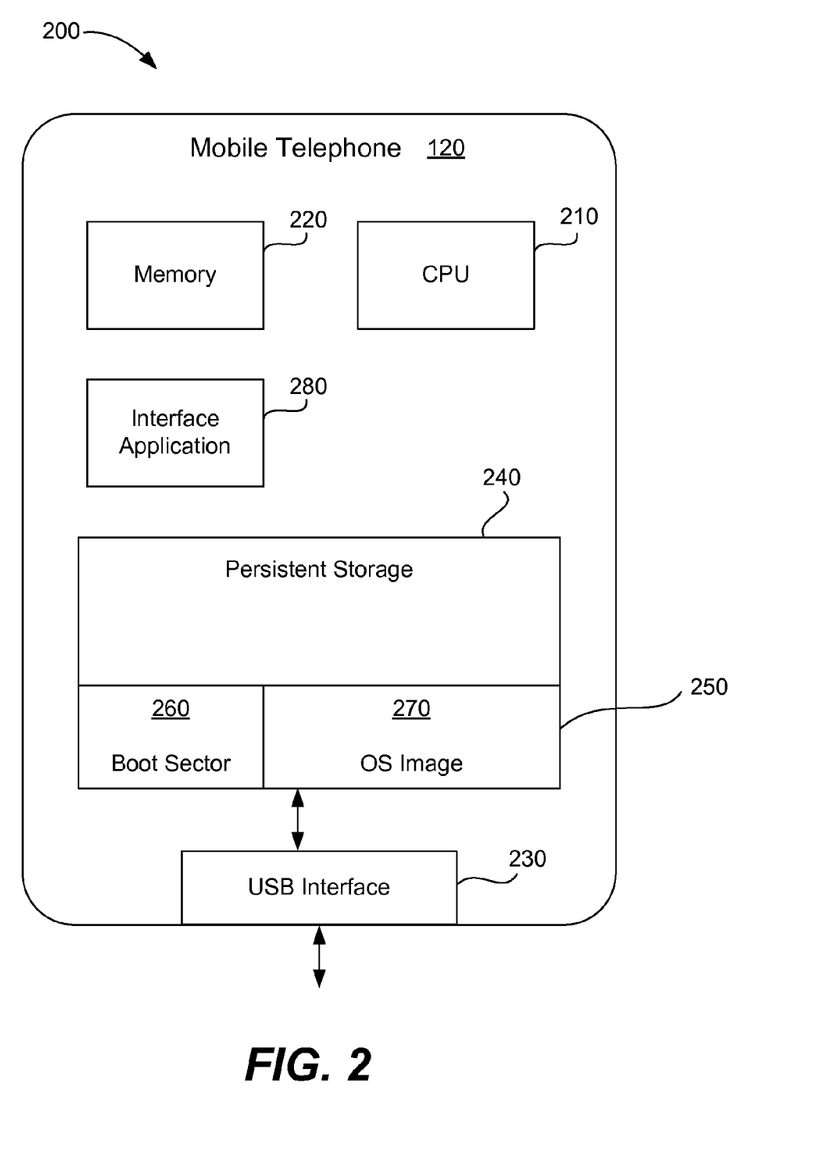
FIG. 2 illustrates in greater detail the mobile telephone.

FIG. 2 illustrates in greater detail the mobile telephone. Included within the telephone are standard features such as CPU 210, memory 220, a USB interface 230 and persistent storage 240. An interface application 280 facilitates not only the transfer of information between the telephone and computer, but also the uploading of antivirus software results to the cloud service 130 and the downloading of patterns, instructions, etc. from the cloud service to the mobile telephone. Preferably, interface application 280 is any suitable mobile application that may be installed on the telephone as is known in the art. Other standard features of a mobile telephone such as its keyboard, display, gyroscope, antenna, telecommunications interface, etc., are not shown so as to present more clearly the present invention. Persistent storage 240 may be any suitable non-volatile mass storage device of the telephone such as a removable SD card, TF card, MS card, flash memory storage, etc. Storage 240 is solid-state storage, unlike a rotating hard disk found in most computers, but is still able to allow the mobile telephone to function as a bootable device as is described below.

Included within the persistent storage is a partition 250 that includes an operating system image 270 suitable for executing within the affected computer 110. The partition also includes a boot sector 260. As known in the art, an operating system image is like an "electronic photocopy" of the operating system of a computer, and includes all necessary drivers, software applications, configuration settings, preferences, etc., needed for operation of the computer. Also as known in the art, the boot sector 260 is a region of a hard disk or other data storage device that contains machine code to be loaded into random-access memory by the BIOS of a computer system. Once the BIOS has selected a boot device (in this case, mobile telephone 120) the BIOS will copy the boot sector 260 from the mobile telephone into memory of the affected computer and then allow code within the boot sector to execute. The boot sector code may be arranged to load the remaining operating system image itself (using an included boot loader), or the boot sector may load a second-stage boot loader from another location within the operating system image in order to load the operating system image. Boot sector 260 may be a master boot record or a volume boot record as is known in the art, or, other non IBM-compatible computer systems may use different boot sector formats suitable for loading the operating system image into the affected computer.

Flow Diagrams

Figure 3:
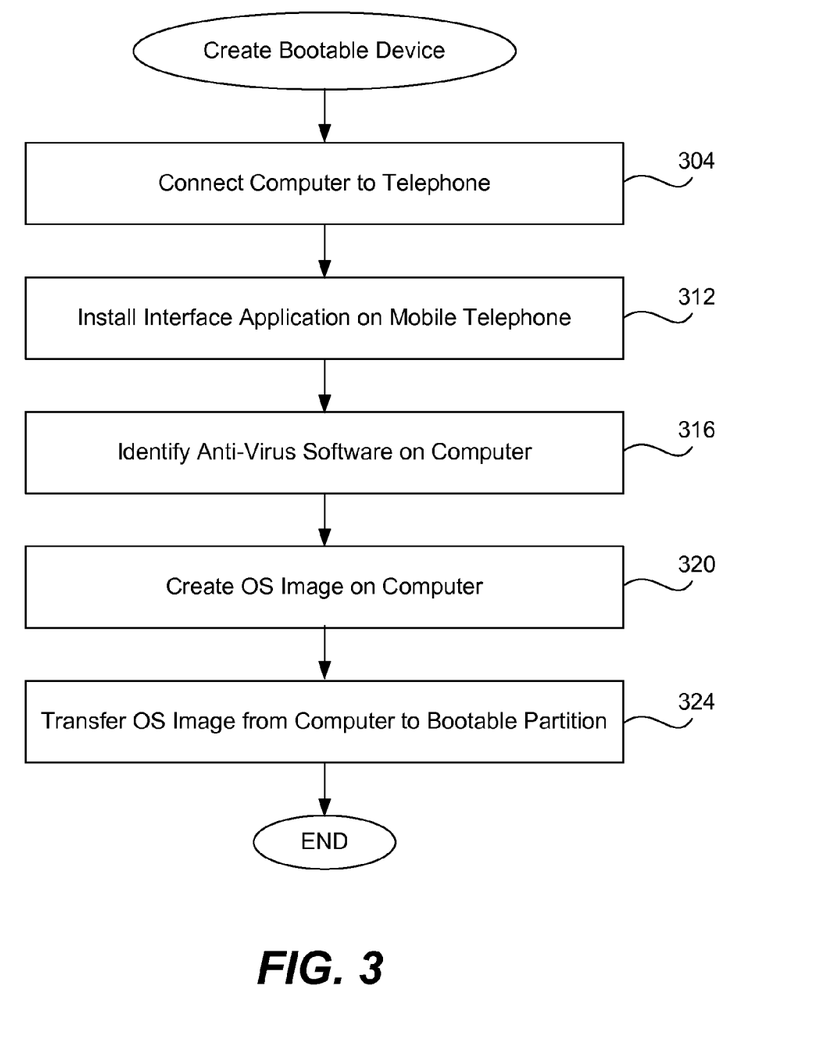
FIG. 3 is a flow diagram describing one embodiment by which the mobile telephone becomes a bootable device.

FIG. 3 is a flow diagram describing one embodiment by which the mobile telephone becomes a bootable device. These steps are performed before the affected computer becomes unusable so that the computer is available to create an operating system image, although the following steps may also be performed on a computer similar to computer 110 as long as an operating system image can be created on the similar computer that will execute on computer 110. For example, the bootable disk creation tools may use a prepared operating system image in order to copy it to the bootable disk. A Microsoft Windows Preinstallation Environment (WinPE) or Linux-like system may run on the hardware of a suitable computer. Thus, the operating system image creation may be done on any available computer and does not necessarily depend on the affected computer on any setting or configuration of the affected computer.

The steps of creating a bootable device on the mobile telephone are similar to those of creating a bootable USB disk. There are many bootable USB drive creator tools (such as Rufus), that can do this. Or, the Bootable USB Drive Creator Tool 1.0 available from Softpedia may be used. The tool will create the boot sector and bootable partition on the SD card and copy the necessary operating system files and tools from an operating system image file to the card. The following steps highlight this activity.

In step 304 the telephone is connected to the available computer or its SD card is plugged in to the computer. For a mobile telephone in which its persistent storage is not removable from the telephone, a USB cable is used to connect the telephone's interface to a USB port of the computer. The creator tool may then transfer the OS image over the USB interface using known techniques.

For a mobile telephone in which the persistent storage 240 may be removed from the telephone (for example, in the case of an SD card), the card is removed from the telephone and then plugged into either an internal SD card reader of the computer itself, or is plugged into an external SD card reader such as a USB card reader. When the SD card is removed and plugged in this fashion, the SD card appears as a removable drive to the computer and thus the partition is formed on this removable drive, the computer not realizing that it is partitioning persistent storage of a mobile telephone.

In step 312 interface application 280 is installed on the mobile telephone. Details on operation of the interface application are provided below.

In step 316 any suitable antivirus software product is identified for use. Basically, the function of the antivirus software product is to diagnose the affected computer and to remove any infected files. Specifically, the antivirus product may be arranged to detect malicious files, registries, etc. using a virus pattern file, may be arranged to collect suspicious files (or the unique identifiers) and send this information over an Internet connection to a cloud-based service for analysis, may be arranged to perform behavior analysis on the operation of the operating system and applications of the computer, or may be arranged to detect malicious software on the computer using other known techniques. It is not strictly necessary that the antivirus software be installed onto the computer, as long as the antivirus software is available to be integrated into the operating system image created in the below step. In one particular embodiment of the invention, the antivirus software product is the Titanium software product available from Trend Micro, Inc. This product is able to scan and clean malicious files on the hard disk.

In step 320 software on a suitable computer is executed in order to create an operating system image that also includes any of a variety of software applications. For example, the antivirus software product identified in step 316 is included within this image such that when the operating system image is used to bootstrap the computer the antivirus product will also be available for execution. Any of a variety of techniques may be used to create an operating system image on a particular computer. For example, the OS image may be created by a user using WinPE and the antivirus tool may be inserted in the OS image during creation. As is known in the art, selections, configuration settings etc., may be used to indicate that the antivirus product shall be included within the operating system image. Or, one obtains an available OS image which may be an ISO file. Then, using a suitable software tool (for example, UltraISO) one edits the ISO file and inserts the antivirus software.

In step 324 the created or obtained operating system image is transferred from a computer to the persistent storage 240 on the mobile telephone. The image may be transferred using a USB cable as described above or by transferring the image directly to the SD card of the telephone which has been plugged into the computer (using either an internal or external card reader). As mentioned above, any suitable USB drive creator tool will create the boot sector and boot partition on the SD card and copy the necessary OS files and tools from an OS image file to the card. For example, the tool Rufus allows a user to create a bootable disk from an ISO OS image.

Figure 4:
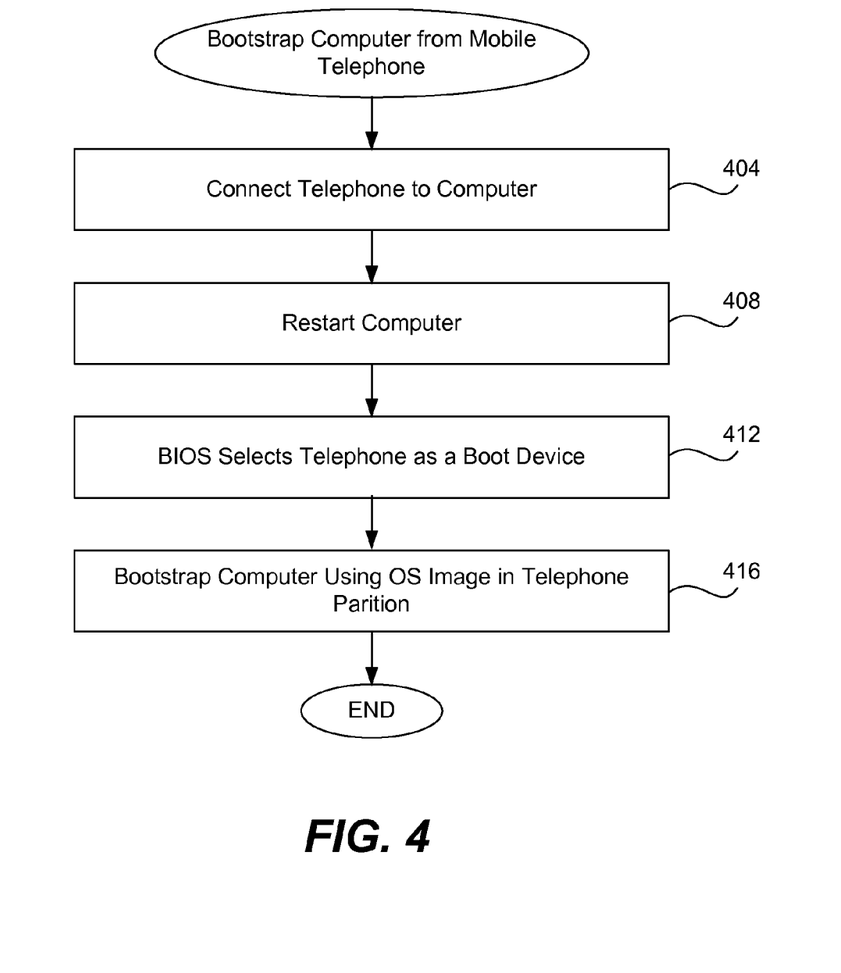
FIG. 4 is a flow diagram describing one embodiment by which an affected computer is bootstrapped using a mobile telephone.

FIG. 4 is a flow diagram describing one embodiment by which an affected computer is bootstrapped using a mobile telephone. It is assumed that the telephone has already been made a bootable device in accordance with the steps of FIG. 3 and that computer 110 is not functioning properly. In step 404 telephone 120 is connected to computer 110 using a USB cable such that the telephone appears to the computer as a removable USB drive. In one embodiment, the 4EXT recovery tool is used to do this. Or, software on the telephone automatically configures the telephone to appear as a drive.

In step 408 the user restarts the computer, turns on the computer, turns the computer off and then on, or performs another similar action in order to cause the BIOS of the computer to begin execution. As is known in the art, the BIOS software (of an IBM-compatible computer, for example) is the first software executed when the computer is turned on and will load the operating system (among other tasks) from a mass storage device. The BIOS locates the boot sector of the first priority bootable device, determines if it is bootable, and loads the boot sector into memory of the computer. When the telephone is connected to the computer using a USB cable, the telephone appears to the computer as a removable device and the BIOS will then automatically detect in step 412 the telephone as a bootable device from which the boot sector should be read. In step 416 boot loader software of the boot sector (or from another location identified by the boot sector) loads the operating system image from the partition into memory of the affected computer. Once the operating system image has been loaded, the boot loader software then transfers control to the new operating system which begins executing on the affected computer. At this point, the operating system is now executing properly, the antivirus product is also loaded and able to be executed upon the computer, but the computer still may harbor malware in the form of malicious files, registries, etc. in the original operating system.

As mentioned, when bootstrapping the computer from the mobile telephone, the operating system image is loaded. The original operating system of the computer is not active (due to malware), but all of its files (including any malware) on computer hard disk are accessible. Thus, the newly loaded antivirus software can find the non-active malware and remove it. In order to make the computer network card function properly, the operating system image should include the corresponding device driver for the card. But, there are many types of network cards, and it is not practical to put all possible drivers in the operating system image nor test them all. Therefore, the below flow describes how the mobile telephone is used to provide network access to allow for diagnosis.

Figure 5:
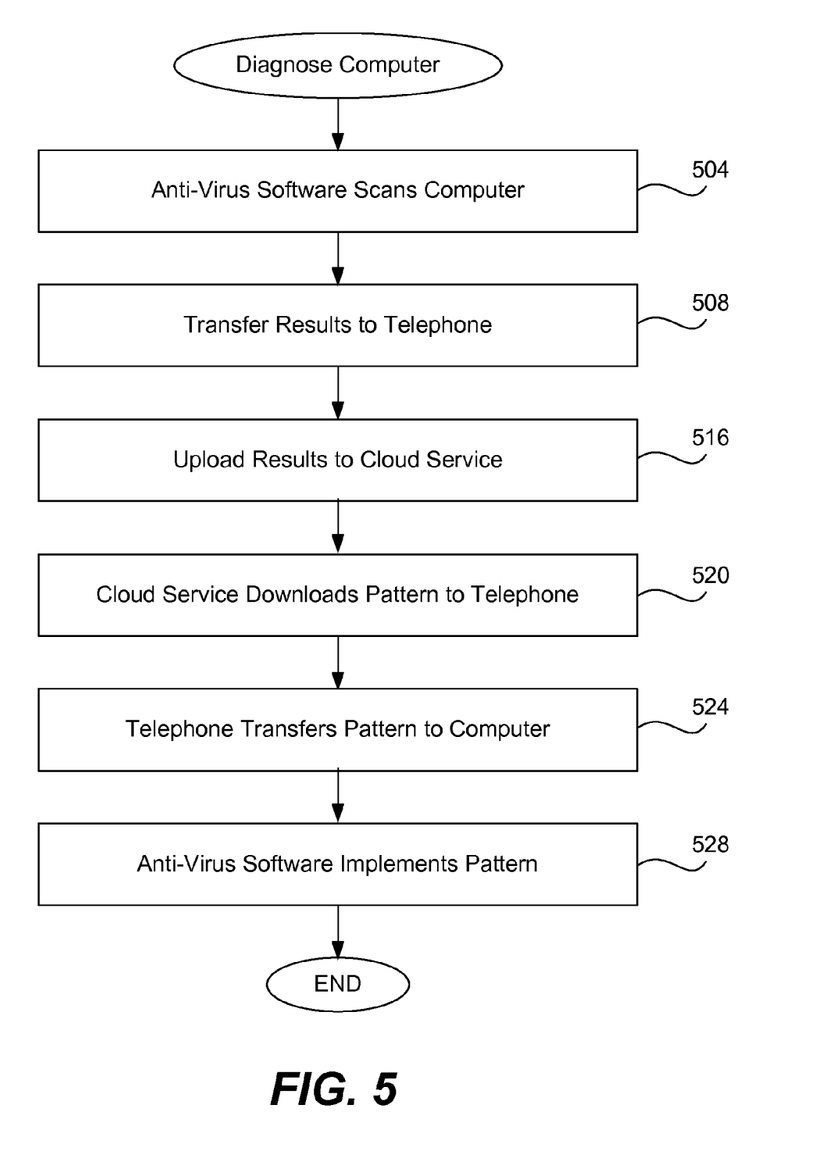
FIG. 5 is a flow diagram describing one embodiment by which a computer may be diagnosed using a mobile telephone.

FIG. 5 is a flow diagram describing one embodiment by which a computer may be diagnosed using a mobile telephone. It is assumed that the attached computer has been bootstrapped and the operating system is executing (either because it has been bootstrapped using the procedure of FIG. 4 or because the operating system was already executing). The computer is connected to the mobile telephone using a USB cable.

In step 504 the antivirus software that had been present in the operating system image of the mobile telephone may begin executing upon the affected computer. Because the operating system image has been loaded into memory of the affected computer, the executable antivirus software is also present. The user may manually begin execution of the software by selecting the antivirus application. The antivirus application may perform any of a number of malware detection techniques such as scanning for malicious files using a virus pattern file, applying a database of rules to detect malware using a behavioral analysis, comparing suspect files to unique identifiers, checking the registry hives and supporting files, etc.

In step 508 the antivirus application completes its execution and obtains any of a number of results that will be sent to the cloud service 130 for analysis. For example, the results may include: the operating system version and other operating system settings; suspicious files; unique identifiers of suspicious files (such as SHA-1 or checksum values of critical operating system files); registry data; information on operating system drivers such as name, checksum value and version; or the web browsing history. These results are transferred from the antivirus application over the USB cable to the interface application 280 resident on the mobile telephone.

The mobile telephone persistent storage 240 is accessible by the antivirus application and by the mobile's interface application. The antivirus application can save any and all scan results as files in the persistent storage and the interface application can then retrieve the results. Similarly, when the interface application receives solutions (patterns, etc.) from the cloud service, these are also stored in persistent storage, and the antivirus software can then retrieve these from persistent storage.

In step 516 interface application 280 on the mobile telephone receives the results from the antivirus application and stores these results temporarily in memory 220. Alternatively, the results may be stored in persistent storage 240. Next, the interface application, using an Internet capability of the telephone (such as a local Wi-Fi connection or Internet service over the telephone line) accesses the Internet and establishes communication with cloud service 130. The interface application then uploads the results from the telephone to the cloud service for analysis, along with information uniquely identifying the mobile telephone so that a response can be directed to the mobile telephone. Preferably, the interface application operates as any normal mobile application. It connects to the cloud service (e.g., the support center of Trend Micro, Inc.) and transfers information using the HTTPS protocol.

Once the cloud service receives the results it analyzes these results using techniques known to those of skill in the art to identify what an appropriate response will be. For example, if the cloud service receives results that consist of unique identifiers for suspicious files identified on the affected computer, then the cloud service will compare these unique identifiers to a database in order to determine whether or not the unique identifiers identify malicious files. If so, then the response would include an indication of which unique identifiers identify malicious files on the computer. In another example, the response from the cloud service is simply the latest virus pattern file, including many virus signatures, which can be used by the affected computer to identify malicious files. In another example, the response from the cloud service is particular instructions for fixing or removing an infected operating system file or instructions for removing malware.

Once the cloud service has created the appropriate response, then in step 520 the cloud service downloads the latest virus pattern file, an indication of which unique identifiers identify malicious files, or other responses as appropriate to the interface application of the mobile telephone. In one embodiment, after information is uploaded to the cloud service, the interface application receives get a unique case identifier. It then closes the connection with service center. After a predefined time interval, the application connects to the service center again and queries for a solution with the case identifier. If the solution is ready, it downloads it. If the solution is not ready, the application closes the connection and waits for another time interval.

In step 524 the interface application receives the response from the cloud service and stores it temporarily in memory 220. Alternatively, the response may be stored in persistent storage 240. The interface application then transfers the received pattern, or other information as the case may be back to the antivirus application on the affected computer over the USB cable. As mentioned above, communication between the cloud service, telephone and antivirus application may make use of files stored in persistent storage.

Finally, in step 528 the antivirus application on the affected computer receives the response from the cloud service and implements the received response. For example, the antivirus application will execute the received latest virus pattern file, will receive an indication of which files on the computer malicious, will receive cleaning patterns to be used to clean malware from infected computer, etc. The antivirus application then deletes a particular file, fixes a registry item, runs a cleaning pattern, etc. in order to remove or counteract any malware.

Computer System Embodiment

Figure 6A:
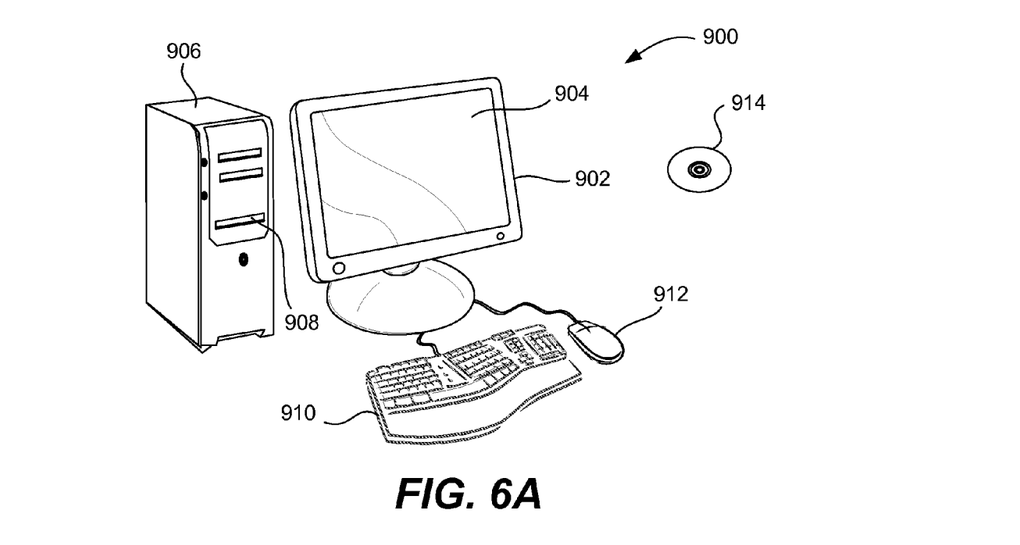
FIGS. 6A and 6B illustrate a computer system suitable for implementing embodiments of the present invention.
Figure 6B:
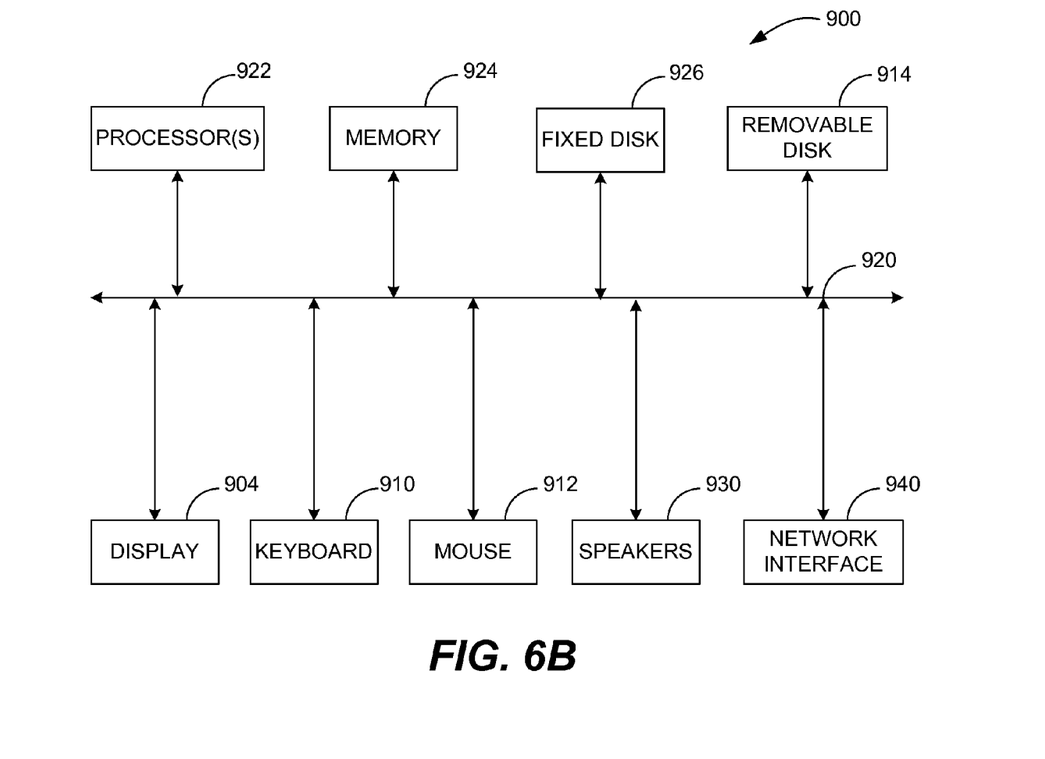

FIGS. 6A and 6B illustrate a computer system 900 suitable for implementing embodiments of the present invention. FIG. 6A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 6B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of diagnosing a computer using a mobile telephone, said method comprising:
   connecting said mobile telephone to said computer, said computer unable to bootstrap itself from its internal drive;
   bootstrapping said computer from persistent storage of said mobile telephone, said bootstrapping including transferring an operating system image from said persistent storage to memory of said computer, said operating system image including executable antivirus software;
   executing said transferred antivirus software on said computer in order to produce results indicative of the presence of malware on said computer;
   transferring said results from said computer to an interface application of said mobile telephone;
   after said transferring of said results, receiving in said computer from said interface application of said computer instructions for removing said malware from said computer, said instructions originating from an antivirus service located remotely from said mobile telephone and not from said mobile telephone; and
   executing said transferred antivirus software on said computer and implementing said received instructions in order to remove said malware from said computer.

2. The method as recited in claim 1 wherein said bootstrapped computer is unable to access the Internet and can only receive said instructions from said antivirus service via said mobile telephone.

3. The method as recited in claim 1 further comprising connecting said mobile telephone to said computer using a USB cable.

4. The method as recited in claim 1 wherein said results include at least one unique identifier of a computer file on said computer suspected of being malware, and wherein said instructions from said antivirus service indicate removing said computer file from said computer.

5. The method as recited in claim 1 wherein said mobile telephone includes the ability to access said antivirus service using an Internet connection.

6. The method as recited in claim 5 wherein said Internet connection uses Wi-Fi, WiMAX or the telephone service of said mobile telephone.

7. A method of diagnosing a computer using a mobile telephone, said method comprising:
- establishing communication between said mobile telephone and said computer;
- transferring an operating system image stored in persistent storage of said mobile telephone to said computer,
- said operating system image including executable antivirus software;
- receiving at an interface application of said mobile telephone results from execution of said antivirus software on said computer, said results indicative of the presence of malware and said computer;
- uploading over an Internet connection said results from said mobile telephone to a remotely located antivirus service;
- after said uploading, receiving at said interface application of said mobile telephone instructions for removing said malware from said computer, said instructions originating from said antivirus service and not from said mobile telephone; and
- sending said instructions from said interface application to said computer, whereby said antivirus software implements said instructions on said computer to remove said malware.

8. The method as recited in claim 7 wherein said computer is unable to bootstrap itself from its internal drive.

9. The method as recited in claim 7 further comprising:
- executing said transferred antivirus software on said computer and implementing said received instructions in order to remove said malware from said computer.

10. The method as recited in claim 7 wherein said bootstrapped computer is unable to access the Internet.

11. The method as recited in claim 7 further comprising connecting said mobile telephone to said computer using a USB cable in order to establish communication.

12. The method as recited in claim 7 wherein said results include at least one unique identifier of a computer file on said computer suspected of being malware, and wherein said instructions from said antivirus service indicate removing said computer file from said computer.

13. The method as recited in claim 7 wherein said mobile telephone includes the ability to access said antivirus service using an Internet connection.

14. A system for removing malware from a computer, said system comprising:
- a computer that is unable to bootstrap itself from its internal drive, said computer including a malicious file;
- a mobile telephone having a partition in its persistent storage that includes an operating system image, said operating system image able to bootstrap said computer and including executable antivirus software, said mobile telephone also having the ability to create an Internet connection;
- a cable connecting said mobile telephone with said computer; and
- an antivirus service located remotely from said mobile telephone and accessible over an Internet connection, said antivirus service arranged to receive results from said antivirus software executing upon said computer and further arranged to produce a response indicating removal of said malicious file.

15. The system as recited in claim 14 wherein said computer being further arranged to bootstrap itself using said operating system image from said mobile telephone.

16. The system as recited in claim 14 wherein said computer being further arranged to execute said antivirus software received from said mobile telephone.

17. The system as recited in claim 14 wherein said computer is unable to access the Internet.

18. The system as recited in claim 14 wherein said mobile telephone further includes an interface application arranged to deliver said results to said antivirus service over an Internet connection and to receive said response from said antivirus service over said Internet connection.

* * * * *